United States Patent
Ogawa (10) Patent No.: US 8,597,460 B2
(45) Date of Patent: Dec. 3, 2013

(54) ADHESION METHOD, AND BIOCHEMICAL CHIP AND OPTICAL COMPONENT MADE BY THE SAME

(71) Applicant: Kazufumi Ogawa, Awa (JP)

(72) Inventor: Kazufumi Ogawa, Awa (JP)

(73) Assignee: Empire Technology Development LLC, Wilmington, DE (US)

(\*) Notice: Subject to any disclaimer, the term of this patent is extended or adjusted under 35 U.S.C. 154(b) by 0 days.

(21) Appl. No.: 13/767,094

(22) Filed: Feb. 14, 2013

(65) Prior Publication Data

US 2013/0157059 A1   Jun. 20, 2013

Related U.S. Application Data (62) Division of application No. 12/601,748, filed as application No. PCT/JP2008/060074 on May 30, 2008, now Pat. No. 8,404,078.

(30) Foreign Application Priority Data

May 30, 2007   (JP) ................. 2007-144045

(51) Int. Cl.
| | |
|---|---|
| B29C 65/00 | (2006.01) |
| B32B 37/00 | (2006.01) |
| B32B 38/04 | (2006.01) |
| C09J 163/00 | (2006.01) |
| G01N 15/06 | (2006.01) |
| G01N 33/00 | (2006.01) |
| G01N 33/48 | (2006.01) |
| B32B 17/06 | (2006.01) |

(52) U.S. Cl.
USPC ....... 156/325; 156/273.7; 156/330; 422/68.1; 428/426

(58) Field of Classification Search
USPC ........ 156/373.7, 325, 330; 422/68.1; 428/426
See application file for complete search history.

(56) References Cited

U.S. PATENT DOCUMENTS

| | | | |
|---|---|---|---|
| 4,822,426 A | 4/1989 | Ito et al. | |
| 4,981,728 A | 1/1991 | Homma et al. | |

(Continued)

FOREIGN PATENT DOCUMENTS

| | | |
|---|---|---|
| JP | 62-289280 A | 12/1987 |
| JP | 64-060680 | 3/1989 |

(Continued)

OTHER PUBLICATIONS

International Preliminary Report on Patentability for PCT/JP2008/060074 mailed Jan. 21, 2010 (with English translation).

(Continued)

Primary Examiner — Michael Orlando
(74) Attorney, Agent, or Firm — Foley & Lardner LLP (57) ABSTRACT

An adhesion method capable of strongly adhering two members without using an adhesive and without impairing a fine structure or optical properties of a joining surface, and a biochemical chip and optical component made by the same are provided. The adhesion method includes step A of forming a coating film 13 of a first film compound having a first functional group on a first joining surface 11 of a first member 21, step B of forming a coating film 14 of a second film compound having a second functional group on a second joining surface 12 of a second member 22, and step C of bringing the first joining surface 11 into contact by pressure with the second joining surface 12 while bringing a coupling agent having at least one coupling reactive group that forms a bond by a coupling reaction with the first functional group and the second functional group into contact with the first and second functional groups to form bonds by the coupling reaction.

14 Claims, 2 Drawing Sheets

(56) References Cited

U.S. PATENT DOCUMENTS

| | | |
|---|---|---|
| 5,248,334 A | 9/1993 | Fey |
| 5,835,256 A | 11/1998 | Huibers |
| 2003/0116273 A1 | 6/2003 | Nakamura et al. |
| 2005/0074919 A1 | 4/2005 | Patel et al. |
| 2005/0099089 A1 | 5/2005 | Baumgartner |
| 2005/0116329 A1 | 6/2005 | Chandran et al. |

FOREIGN PATENT DOCUMENTS

| | | |
|---|---|---|
| JP | 02-212577 A | 8/1990 |
| JP | 02-310527 A | 12/1990 |
| JP | 05-174733 A | 7/1993 |
| JP | 06-082600 A | 3/1994 |
| JP | 11-100238 A | 4/1999 |
| JP | 2003-246971 | 9/2003 |
| JP | 2003-309227 A | 10/2003 |
| JP | 2005-139458 A | 6/2005 |
| JP | 2005-221478 | 8/2005 |
| JP | 2005-534048 A | 11/2005 |
| JP | 2007-013026 A | 1/2007 |
| JP | 2007-033167 | 2/2007 |
| JP | 2007-077429 | 3/2007 |
| JP | 2007-117826 A | 5/2007 |
| JP | 2007-161912 | 6/2007 |
| JP | 2007-220884 | 8/2007 |

OTHER PUBLICATIONS

International Search Report issued for PCT/JP2008/060074 mailed Aug. 26, 2008 (and English translation).

Final Office Action received on U.S. Appl. No. 12/601,748 dated Oct. 16, 2012.

Non-final Office Action received for U.S. Appl. No. 12/601,748 dated Jul. 17, 2012.

Notice of Allowance received for U.S. Appl. No. 12/601,748 dated Dec. 7, 2012.

International Search Report for Intl. Pat. Appln. No. PCT/JP2008/061327, mailed on Jul. 22, 2008, 2 pp.

FIG. 1

IN THE FIGURE, a REPRESENTS

FIG. 2

IN THE FIGURE,

FIG. 3

ADHESION METHOD, AND BIOCHEMICAL CHIP AND OPTICAL COMPONENT MADE BY THE SAME

CROSS-REFERENCE TO RELATED APPLICATIONS

The present application is a divisional application of U.S. patent application Ser. No. 12/601,748, filed on Nov. 24, 2009, which is a U.S. national stage application claiming the benefit of International Application No. PCT/JP2008/060074, filed on May 30, 2008, which claims the benefit of Japanese Application No. 2007-144045, filed on May 30, 2007, the entire contents of which are incorporated herein by reference in their entirety.

TECHNICAL FIELD

The present invention relates to an adhesion method and a biochemical chip and optical component made by the same. More specifically, the present invention relates to a method of achieving adhesion without using an adhesive by introducing a reactive functional group into a surface of each of joining surfaces by forming a coating film made of a film compound having the reactive functional group, and chemically bonding the joining surfaces via bonds formed between a coupling agent and the functional group, and a biochemical chip and optical component made by the same.

BACKGROUND ART

A technique in which two members are adhered to each other by applying an adhesive to one of or both of joining surfaces, pressure-bonding the joining surfaces to each other, and curing the adhesive is generally well known (see, for example, Patent Document 1). However, when a fine structure (for example, a hole or groove having a size of micrometers level) is provided on at least one of the joining surfaces, for example, as in the case of a member of a biochemical chip, it is very difficult to achieve adhesion with no clearance without filling the fine structure with a fluid adhesive.

In addition, by a known method using an adhesive, it is also very difficult to achieve adhesion of an optical member such as a lens without degrading optical properties thereof because the thickness of the adhesive or the like on a joining surface becomes uneven.

As an adhesion method without using an adhesive, for example, Patent Document 2 discloses a method of adhering foil-like or film-like materials to each other with an organic monomolecular film therebetween. In the method described in this document, for example, aluminum foils in which an organic monomolecular film having an aliphatic hydrocarbon group is bonded to a surface thereof adhere to each other through intermolecular force and a negative pressure.

Patent Document 1: Japanese Unexamined Patent Application Publication No. 2005-221478
Patent Document 2: Japanese Unexamined Patent Application Publication No. 2003-246971

DISCLOSURE OF INVENTION

Problem to be Solved by the Invention

However, in the method described in Patent Document 2 in which adhesion is achieved utilizing intermolecular force acting on an organic monomolecular film and a negative pressure during pressure bonding of members, the adhesive strength is too low, and thus the method cannot be applied to adhesion of a biochemical chip, an optical component, or the like.

The present invention has been made in view of the above problem, and it is an object of the present invention to provide an adhesion method capable of strongly adhering two members without using an adhesive and without impairing a fine structure or optical properties of a joining surface, and a biochemical chip and optical component made by the same.

Means for Solving the Problems

An adhesion method according to a first invention that achieves the above object is a method of adhering a first joining surface of a first member to a second joining surface of a second member including step A of bringing a first film compound having a first functional group at an end of its molecule and a first surface bonding group at another end thereof into contact with the first joining surface to form a bond between the first surface bonding group and a surface functional group of the first joining surface, thereby forming a coating film of the first film compound on the first joining surface; step B of bringing a second film compound having a second functional group at an end of its molecule and a second surface bonding group at another end thereof into contact with the second joining surface to form a bond between the second surface bonding group and a surface functional group of the second joining surface, thereby forming a coating film of the second film compound on the second joining surface; and step C of bringing the first joining surface having the coating film of the first film compound thereon into contact by pressure with the second joining surface having the coating film of the second film compound thereon while setting a coupling agent having at least one first coupling functional group that forms a bond by a coupling reaction with the first functional group and at least one second coupling reactive group that forms a bond by a coupling reaction with the second functional group to be in contact with the first functional group and the second functional group to form bonds by coupling reactions between the first functional group and the first coupling reactive group and between the second functional group and the second coupling reactive group.

In the adhesion method according to the first invention, in step C, first, the coupling agent may be brought into contact with the coating film of the first film compound formed on the first joining surface to form a bond by a coupling reaction between the first functional group and the first coupling reactive group, thereby forming a coating film of the coupling agent on the surface of the coating film of the first film compound, and the first joining surface further having the coating film of the coupling agent thereon may then be brought into contact by pressure with to the second joining surface having the coating film of the second film compound thereon to form a bond by a coupling reaction between the second functional group and the second coupling reactive group.

In the adhesion method according to the first invention, each of the first functional group and the second functional group may be a functional group containing an epoxy group, and the coupling agent may be a compound containing an imidazole group.

In the adhesion method according to the first invention, each of the first surface bonding group and the second surface bonding group may be an alkoxysilyl group.

In the adhesion method according to the first invention, in step C, the first member and the second member are preferably heated at the same temperature.

A biochemical chip according to a second invention includes a first member and a second member, wherein, on a first joining surface of the first member, a coating film of a first film compound having a first functional group at an end of its molecule and bonded to the first joining surface at another end thereof is provided, on a second joining surface of the second member, a coating film of a second film compound having a second functional group at an end of its molecule and bonded to the second joining surface at another end thereof is provided, the first functional group and the second functional group are bonded to each other via bonds formed by coupling reactions between the first functional group and a coupling agent having at least one first coupling reactive group that forms a bond by a coupling reaction with the first functional group and at least one second coupling reactive group that forms a bond by a coupling reaction with the second functional group and between the second functional group and the coupling agent, and the first joining surface is adhered to the second joining surface via the formed bonds.

In the present invention, the term "biochemical chip" refers to a chemical device for performing an operation such as mixing, synthesis, extraction, purification, analysis, or measurement of a compound in a channel having a width on the order of micrometers. Specific examples thereof include a chemical chip, a biochip, a biochemical electrophoresis chip, a biochemical reactor, a biochemical fluid system, and a DNA chip, which are used in a chemical experiment, a bio-experiment, medical diagnosis, and the like.

In the biochemical chip according to the second invention, each of the first functional group and the second functional group may be a functional group containing an epoxy group, and the coupling agent may be a compound containing an imidazole group.

In the biochemical chip according to the second invention, each of the coating film of the first film compound and the coating film of the second film compound is preferably a monomolecular film.

An optical component according to a third invention includes a first member and a second member, wherein, on a first joining surface of the first member, a coating film of a first film compound having a first functional group at an end of its molecule and bonded to the first joining surface at another end thereof is provided, on a second joining surface of the second member, a coating film of a second film compound having a second functional group at an end of its molecule and bonded to the second joining surface at another end thereof is provided, the first functional group and the second functional group are bonded to each other via bonds formed by coupling reactions between the first functional group and a coupling agent having at least one first coupling reactive group that forms a bond by a coupling reaction with the first functional group and at least one second coupling reactive group that forms a bond by a coupling reaction with the second functional group and between the second functional group and the coupling agent, and the first joining surface is adhered to the second joining surface via the formed bonds.

In the present invention, the term "optical component" refers to any light-transmissive member used in an optical instrument. Specific examples thereof include a lens, a prism, an optical fiber, and an optical recording medium.

In the optical component according to the third invention, each of the first functional group and the second functional group may be a functional group containing an epoxy group, and the coupling agent may be a compound containing an imidazole group.

In the optical component according to the third invention, each of the coating film of the first film compound and the coating film of the second film compound is preferably a monomolecular film.

Effect of the Invention

In the adhesion methods described in Claims 1 to 5, a first film compound and a second film compound covering a first joining surface and a second joining surface, respectively, are strongly bonded to the first joining surface and the second joining surface, respectively, via covalent bonds, and a first functional group and a second functional group are strongly bonded to each other via covalent bonds formed by coupling reactions with a coupling agent. Accordingly, the first joining surface can be strongly bonded to the second joining surface.

In addition, no adhesive is used, and thus adhesion can be achieved without impairing a fine structure formed on a joining surface or optical properties. Therefore, the methods can be suitably used in adhesion of a biochemical chip or an optical component.

In particular, in the adhesion method described in Claim 2, first, the coupling agent is brought into contact with the coating film of the first film compound formed on the first joining surface to form a bond by a coupling reaction between the first functional group and a first coupling reactive group, thereby forming a coating film of the coupling agent on the surface of the coating film of the first film compound, and the first joining surface further having the coating film of the coupling agent thereon is then brought into contact by pressure with the second joining surface having the coating film of the second film compound thereon to form a bond by a coupling reaction between the second functional group and a second coupling reactive group. Accordingly, excess coupling agent can be removed before adhesion. Therefore, elution of excess coupling agent after adhesion and degradation of optical properties due to discoloration can be suppressed.

In the adhesion method described in Claim 3, each of the first functional group and the second functional group is a functional group containing an epoxy group, and the coupling agent is a compound containing an imidazole group. Accordingly, strong bonds can be formed by heating at a relatively low temperature.

In the adhesion method described in Claim 4, each of the first surface bonding group and the second surface bonding group is an alkoxysilyl group. Accordingly, they can form a strong bond on a joining surface having an active hydrogen group such as a hydroxyl group via a covalent bond (siloxane bond).

In the adhesion method described in Claim 5, in step C, by heating the first member and the second member at the same temperature, generation of thermal distortion can be suppressed, and thus the dimensional accuracy of the first joining surface and the second joining surface in the adhesion can be improved.

In the biochemical chips described in Claims 6 to 8, a first film compound and a second film compound covering a first joining surface and a second joining surface, respectively, are strongly bonded to the first joining surface and the second joining surface, respectively, via covalent bonds, and a first functional group and a second functional group are strongly bonded to each other via covalent bonds formed by coupling reactions with a coupling agent.

Accordingly, the first joining surface can be strongly bonded to the second joining surface. In addition, adhesion is achieved without using an adhesive, and thus the biochemical chips can be made without clogging a groove-like or hole-like fluid channel provided on a joining surface and having a size of micrometers level.

In the biochemical chip described in Claim 7, each of the first functional group and the second functional group is a functional group containing an epoxy group, and the coupling agent is a compound containing an imidazole group. Accordingly, strong bonds can be formed by heating at a relatively low temperature.

In the biochemical chip described in Claim 8, each of the coating film of the first film compound and the coating film of the second film compound is a monomolecular film. Accordingly, the dimensional accuracy in the adhesion can be improved.

In the optical components described in Claims 9 to 11, a first film compound and a second film compound covering a first joining surface and a second joining surface, respectively, are strongly bonded to the first joining surface and the second joining surface, respectively, via covalent bonds, and a first functional group and a second functional group are strongly bonded to each other via covalent bonds formed by coupling reactions with a coupling agent. Accordingly, the first joining surface can be strongly bonded to the second joining surface. In addition, adhesion is achieved without using an adhesive, and thus the optical components can be made without impairing optical properties of the joining surfaces.

In the optical component described in Claim 10, each of the first functional group and the second functional group is a functional group containing an epoxy group, and the coupling agent is a compound containing an imidazole group. Accordingly, strong bonds can be formed by heating at a relatively low temperature.

In the optical component described in Claim 11, each of the coating film of the first film compound and the coating film of the second film compound is a monomolecular film. Accordingly, the dimensional accuracy in the adhesion can be improved.

BEST MODES FOR CARRYING OUT THE INVENTION

Figure 1:
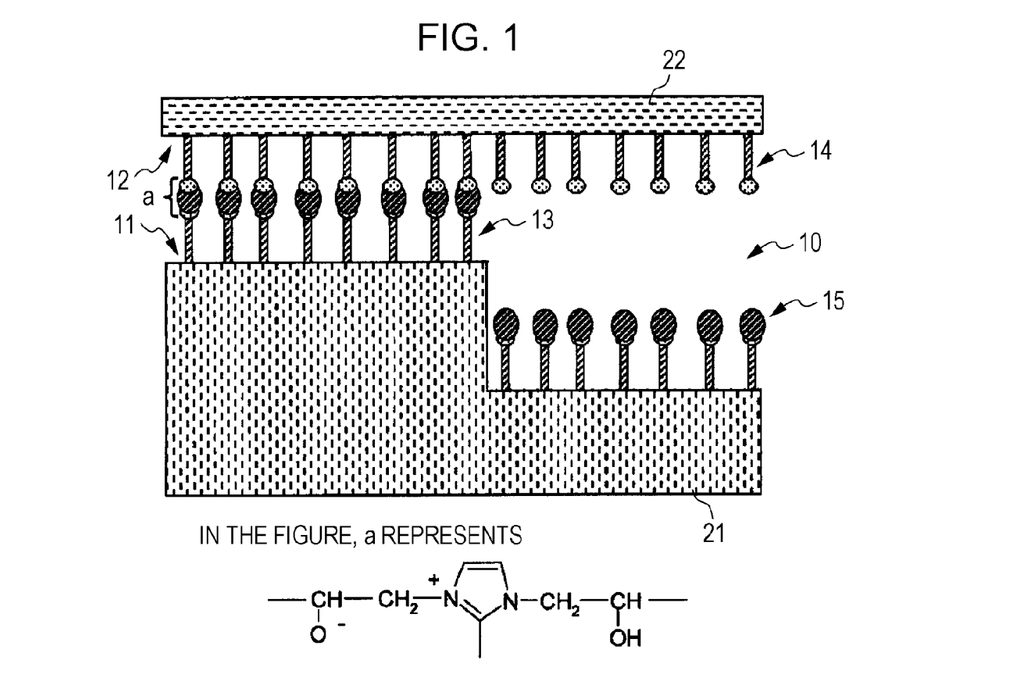
FIG. 1 is an explanatory view that schematically shows a partial structure of a cross section of a biochemical chip according to an embodiment of the present invention.
Figure 2:
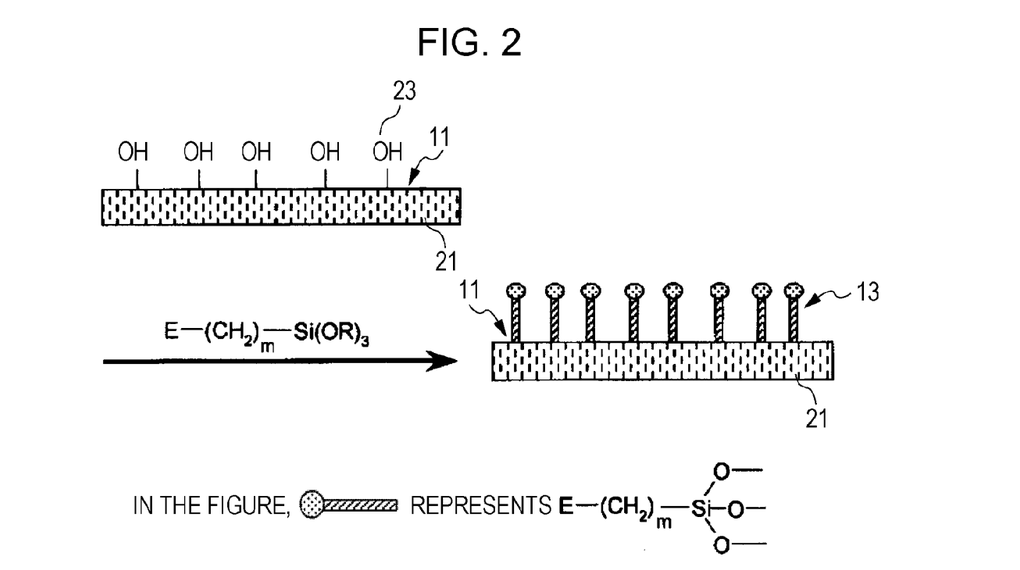
FIG. 2 is a conceptual view in which the vicinity of a surface of a first base material before and after formation of a coating film of a first film compound is enlarged to the molecular level in order to illustrate a step of forming the coating film of the first film compound on a first joining surface in a method of producing the biochemical chip.
Figure 3:
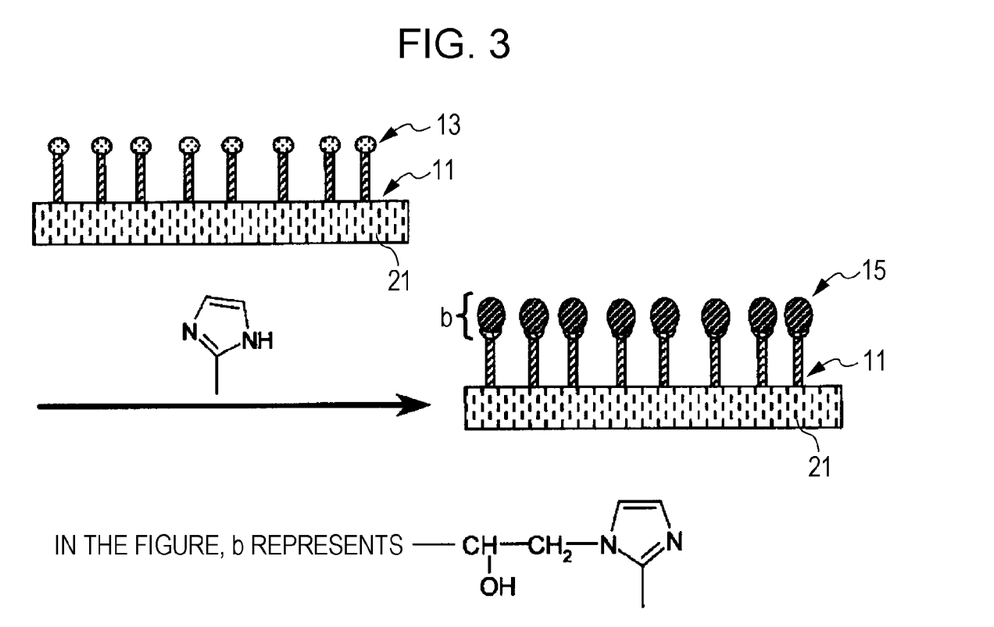
FIG. 3 is a conceptual view in which the vicinity of the surface of the first base material before and after formation of a coating film of a coupling agent is enlarged to the molecular level in order to illustrate a step of forming the coating film of the coupling agent on the surface of the first film compound in the method of producing the biochemical chip.

Embodiments of the present invention will now be described with reference to the drawings to achieve the understanding of the present invention. FIG. 1 is an explanatory view that schematically shows a partial structure of a cross section of a biochemical chip according to an embodiment of the present invention. FIG. 2 is a conceptual view in which the vicinity of a surface of a first base material before and after formation of a coating film of a first film compound is enlarged to the molecular level in order to illustrate a step of forming the coating film of the first film compound on a first joining surface in a method of producing the biochemical chip. FIG. 3 is a conceptual view in which the vicinity of the surface of the first base material before and after formation of a coating film of a coupling agent is enlarged to the molecular level in order to illustrate a step of forming the coating film of the coupling agent on the surface of the first film compound in the method of producing the biochemical chip.

As shown in FIGS. 1 to 3, a biochemical chip 10 according to an embodiment of the present invention includes a first base material (an example of a first member) 21 and a second base material 22 (an example of a second member) 22. On a first joining surface 11 of the first base material 21, a monomolecular film 13 which is an example of a coating film of a first film compound that has an epoxy group (an example of a first functional group) at one end of its molecule and that is bonded to the first joining surface 11 at another end thereof is provided. On a second joining surface 12 of the second base material 22, a monomolecular film 14 which is an example of a coating film of a second film compound that has an epoxy group (an example of a second functional group) at one end of its molecule and that is bonded to the second joining surface 12 at another end thereof is provided. The epoxy group on the monomolecular film 13 of the first film compound and the epoxy group on the monomolecular film 14 of the second film compound are bonded to each other via bonds formed by coupling reactions between each of the epoxy groups and 2-methylimidazole (an example of a coupling agent) having, in its molecule, an amino group and an imino group (an example of a first coupling reactive group and an example of a second coupling reactive group) each of which undergoes a coupling reaction with an epoxy group to form a bond. The first joining surface 11 and the second joining surface 12 adhere to each other via the bonds formed as described above.

The biochemical chip 10 is produced by an adhesion method including step A (see FIG. 2) of bringing a first film compound having an epoxy group at an end of its molecule and an alkoxysilyl group (an example of a first surface bonding group) at another end thereof into contact with a first joining surface 11 of a first base material 21 to form a monomolecular film 13 of the first film compound via a bond formed between the alkoxysilyl group and a hydroxyl group (an example of a surface functional group of the first joining surface 11) 23; step B of forming a monomolecular film 14 of a second film compound on a second joining surface 12 of a second base material 22 via a bond formed between an alkoxysilyl group and a hydroxyl group (an example of a surface functional group of the second joining surface 12) by the same method as that in step A; and step C of, first, bringing 2-methylimidazole into contact with the monomolecular film 13 of the first film compound to form a bond by a coupling reaction between the epoxy group and an amino group of 2-methylimidazole, thereby forming a monomolecular film 15 of a 2-methylimidazole derivative (an example of coating film of a coupling agent) on the surface of the monomolecular film 13 of the first film compound; and then bringing the first joining surface 11 further having the monomolecular film 15 of the 2-methylimidazole derivative thereon into contact by pressure with the second joining surface 12 having the monomolecular film 14 of the second film compound thereon to form a bond by a coupling reaction between an epoxy group and an imino group of 2-methylimidazole.

Steps A to C will now be described in more detail.

In step A, a first film compound having an epoxy group is brought into contact with a first joining surface 11 of a first base material 21 made of glass to form a monomolecular film 13 of the first film compound having an epoxy group on the first joining surface 11 (see FIG. 2). The size and the shape of the first base material 21 that can be used are not particularly limited, but the first joining surface 11 preferably has a mirror-finished surface having a surface roughness of 1 μm or less, and preferably 100 nm or less.

As the first film compound having an epoxy group, any compound that can be adsorbed or bonded to a surface of the first base material 21 to form a monomolecular film by self-assembly can be used. An alkoxysilane compound in which a functional group containing an epoxy group (oxirane ring) is disposed at an end of a straight-chain alkylene group and an alkoxysilyl group is disposed at another end thereof, and which is represented by a general formula (Chem. 1) below is preferable.

[Chem. 1]

In the above formula, E represents a functional group having an epoxy group, m represents an integer in the range of 3 to 20, and R represents an alkyl group having 1 to 4 carbon atoms.

Specific examples of the first film compound having an epoxy group that can be used include alkoxysilane compounds represented by (1) to (12) below.

In the case where the surface roughness of the joining surface is large, a film compound having a long molecular chain is preferably used.

(1) $(CH_2OCH)CH_2O(CH_2)_3Si(OCH_3)_3$
(2) $(CH_2OCH)CH_2O(CH_2)_7Si(OCH_3)_3$
(3) $(CH_2OCH)CH_2O(CH_2)_{11}Si(OCH_3)_3$
(4) $(CH_2CHOCH(CH_2)_2)CH(CH_2)_2Si(OCH_3)_3$
(5) $(CH_2CHOCH(CH_2)_2)CH(CH_2)_4Si(OCH_3)_3$
(6) $(CH_2CHOCH(CH_2)_2)CH(CH_2)_6Si(OCH_3)_3$
(7) $(CH_2OCH)CH_2O(CH_2)_3Si(OC_2H_5)_3$
(8) $(CH_2OCH)CH_2O(CH_2)_7Si(OC_2H_5)_3$
(9) $(CH_2OCH)CH_2O(CH_2)_{11}Si(OC_2H_5)_3$
(10) $(CH_2CHOCH(CH_2)_2)CH(CH_2)_2Si(OC_2H_5)_3$
(11) $(CH_2CHOCH(CH_2)_2)CH(CH_2)_4Si(OC_2H_5)_3$
(12) $(CH_2CHOCH(CH_2)_2)CH(CH_2)_6Si(OC_2H_5)_3$

Here, a $(CH_2OCH)CH_2O$— group represents a functional group (glycidyloxy group) represented by Chem. 2, and a $(CH_2CHOCH(CH_2)_2)CH$— group represents a functional group (3,4-epoxycyclohexyl group) represented by Chem. 3.

[Chem. 2]

[Chem. 3]

The monomolecular film 13 of the first film compound is formed by applying a reaction mixture containing an alkoxysilane compound having an epoxy group, a condensation catalyst for accelerating a condensation reaction between an alkoxysilyl group and a hydroxyl group 23 disposed on a surface of the first base material 21, and a nonaqueous organic solvent on the surface of the first base material 21, and allowing the reaction mixture to react in air at room temperature. The application can be performed using any method such as a doctor blade method, a dip-coating method, a spin-coating method, a spray method, a screen printing method, or an ink jet printing method.

As the condensation catalyst, a metal salt such as a carboxylic acid metal salt, a carboxylate metal salt, a carboxylic acid metal salt polymer, a carboxylic acid metal salt chelate, a titanate, or a titanate chelate can be used.

The amount of condensation catalyst added is preferably in the range of 0.2 to 5 mass percent, and more preferably in the range of 0.5 to 1 mass percent of the alkoxysilane compound.

Specific examples of the carboxylic acid metal salt include stannous acetate, dibutyltin dilaurate, dibutyltin dioctoate, dibutyltin diacetate, dioctyltin dilaurate, dioctyltin dioctoate, dioctyltin diacetate, stannous dioctoate, lead naphthenate, cobalt naphthenate, and iron 2-ethylhexenoate.

Specific examples of the carboxylate metal salt include dioctyltin bisoctyl thioglycolate and dioctyltin maleate.

Specific examples of the carboxylic acid metal salt polymer include dibutyltin maleate polymers and dimethyltin mercaptopropionate polymers.

Specific examples of the carboxylic acid metal salt chelate include dibutyltin bisacetylacetate and dioctyltin bisacetyl-laurate.

Specific examples of the titanate include tetrabutyl titanate and tetranonyl titanate.

A specific example of the titanate chelate is bis(acetylacetonyl)dipropyl titanate.

A condensation reaction between the alkoxysilyl group and the hydroxyl group 23 disposed on the surface of the first base material 21 occurs to produce the monomolecular film 23 which is made of the first film compound having an epoxy group and which has the structure represented by Chem. 4 below. Three single bonds extending from oxygen atoms are bonded to silicon (Si) atoms of the surface of the first base material 21 or silicon atoms of an adjacent silane compound. Among the three single bonds, at least one single bond is bonded to a silicon atom of the surface of the first base material 21.

[Chem. 4]

The reaction is preferably performed in air with a relative humidity of 45% or less because the alkoxysilyl group is decomposed in the presence of moisture. Note that the condensation reaction is inhibited by grease and moisture adhered to the surface of the first base material 21. Therefore, it is preferable that these impurities are removed in advance by sufficiently washing and then drying the first base material 21.

In the case where any one of the above-mentioned metal salts is used as the condensation catalyst, the time required for completing the condensation reaction is about two hours.

In the case where one or more compounds selected from the group consisting of ketimine compounds, organic acids, aldimine compounds, enamine compounds, oxazolidine compounds, and aminoalkylalkoxysilane compounds are used as the condensation catalyst instead of the above-mentioned metal salts, the reaction time can be reduced to about ½ to ⅔.

Alternatively, when these compounds are used as a cocatalyst as a mixture with the above-mentioned metal salts (these compounds can be used in a mass ratio in the range of 1:9 to 9:1, but the mass ratio is preferably about 1:1), the reaction time can be further reduced.

For example, when the monomolecular film 13 of the first film compound is formed under the same conditions except that H3 manufactured by Japan Epoxy Resins Co., Ltd., which is a ketimine compound, is used as the condensation catalyst instead of dibutyltin bisacetylacetate, which is a carboxylic acid metal salt chelate, the reaction time can be reduced to about one hour without impairing the quality of the first base material 21.

Furthermore, when the monomolecular film 13 of the first film compound is formed under the same conditions except that a mixture (mixing ratio: 1:1) of H3 manufactured by Japan Epoxy Resins Co., Ltd. and dibutyltin bisacetylacetonate is used as the condensation catalyst, the reaction time can be reduced to about 20 minutes.

Examples of the ketimine compound that can be used here include, but are not particularly limited to, 2,5,8-triaza-1,8-nonadiene, 3,11-dimethyl-4,7,10-triaza-3,10-tridecadiene, 2,10-dimethyl-3,6,9-triaza-2,9-undecadiene, 2,4,12,14-tetramethyl-5,8,11-triaza-4,11-pentadecadiene, 2,4,15,17-tetramethyl-5,8,11,14-tetraaza-4,14-octadecadiene, and 2,4,20,22-tetramethyl-5,12,19-triaza-4,19-trieicosadiene.

Examples of the organic acid that can be used include, but are also not particularly limited to, formic acid, acetic acid, propionic acid, butyric acid, and malonic acid.

In producing the reaction mixture, an organochlorine solvent, a hydrocarbon solvent, a fluorocarbon solvent, a silicone solvent, and a mixed solvent thereof can be used. In order to prevent hydrolysis of the alkoxysilane compound, it is preferable that moisture is removed in advance from the solvent used using a desiccant or by distillation. The boiling point of the solvent is preferably in the range of 50° C. to 250° C.

Specific examples of the solvent that can be used include nonaqueous petroleum naphtha, solvent naphtha, petroleum ether, petroleum benzine, isoparaffin, normal paraffin, decalin, industrial gasoline, nonane, decane, heating oil, dimethyl silicone, phenyl silicone, alkyl-modified silicone, polyether silicone, and dimethylformamide.

Furthermore, an alcohol solvent such as methanol, ethanol, or propanol, or a mixture thereof can also be used.

Examples of the fluorocarbon solvent that can be used include flon solvents, Fluorinert (manufactured by 3M in the United States), and Aflude (manufactured by Asahi Glass Co., Ltd.). These may be used alone or in combinations of two or more solvents that can be sufficiently mixed with each other. Furthermore, an organochlorine solvent such as dichloromethane or chloroform may be added.

A preferable concentration of the alkoxysilane compound in the reaction mixture is in the range of 0.5 to 3 mass percent.

After the reaction, washing is performed with a solvent to remove excess alkoxysilane compound and condensation catalyst remaining on the surface as unreacted products. Consequently, the monomolecular film 13 of the first film compound is formed on the first joining surface 11. A schematic view of the vicinity of the first joining surface 11 on which the monomolecular film 13 of the first film compound is thus formed is shown in FIG. 2.

Any solvents that can dissolve the alkoxysilane compound can be used as the washing solvent. For example, dichloromethane, chloroform, or N-methylpyrrolidone, which is inexpensive, which can solve the alkoxysilane, and which can be easily removed by air drying is preferable.

After the reaction, when the first base material 21 is left to stand in air without washing with a solvent, a portion of the alkoxysilane compound remaining on the surface is hydrolyzed by moisture in air, and a condensation reaction between a resulting silanol group and an alkoxysilyl group occurs. As a result, an ultrathin polymer film made of polysiloxane is formed on the first joining surface 11. This polymer film is not necessarily completely fixed on the first joining surface 11 by covalent bonding. However, the polymer film contains an epoxy group, and thus has a reactivity similar to that of the monomolecular film 13 of the first film compound. Therefore, even if washing is not performed, no particular problem occurs in the subsequent production process.

In this embodiment, an alkoxysilane compound having an epoxy group is used. Alternatively, an alkoxysilane compound in which an amino group is disposed at an end of a straight-chain alkylene group and an alkoxysilyl group is disposed at another end thereof, and which is represented by a general formula (Chem. 5) below may be used.

[Chem. 5]

In the above formula, m represents an integer in the range of 3 to 20, and R represents an alkyl group having 1 to 4 carbon atoms.

Specific examples of the film compound having an amino group that can be used include alkoxysilane compounds represented by (21) to (28) below.

(21) $H_2N(CH_2)_3Si(OCH_3)_3$
(22) $H_2N(CH_2)_5Si(OCH_3)_3$
(23) $H_2N(CH_2)_7Si(OCH_3)_3$
(24) $H_2N(CH_2)_9Si(OCH_3)_3$
(25) $H_2N(CH_2)_5Si(OC_2H_5)_3$
(26) $H_2N(CH_2)_5Si(OC_2H_5)_3$
(27) $H_2N(CH_2)_7Si(OC_2H_5)_3$
(28) $H_2N(CH_2)_9Si(OC_2H_5)_3$

Among the condensation catalysts that can be used in the reaction mixture, compounds containing a tin (Sn) salt cannot be used as a condensation catalyst for an alkoxysilane compound having an amino group because such compounds react with the amino group to produce a precipitation.

Accordingly, when an alkoxysilane compound having an amino group is used, except for carboxylic acid tin salts, carboxylate tin salts, carboxylic acid tin salt polymers, and carboxylic acid tin salt chelates, the same compound as those used in the case of an alkoxysilane compound having an epoxy group can be used alone or as a mixture of two or more compounds as a condensation catalyst.

The type of cocatalyst that can be used and combinations thereof; the type of solvent; the concentrations of the alkoxysilane compound, the condensation catalyst, and the cocatalyst; reaction conditions; and the reaction time are the same as those in the case of an alkoxysilane compound having an epoxy group, and thus a description thereof is omitted.

In this embodiment, glass is used as the first base material. Alternatively, a metal such as aluminum, ceramics, or a synthetic resin such as an acrylic resin or polycarbonate can also be used.

When the base material has an active hydrogen group such as a hydroxyl group or an amino group on the surface thereof, an alkoxysilane compound can be used as the film compound as in the case of glass. Specific examples of such a base material include metals such as aluminum and ceramics.

When a synthetic resin is used as the base material, by performing a treatment, for example, grafting a compound having an active hydrogen group by a plasma treatment or the like, an alkoxysilane compound can be used as the film compound in some cases.

FIG. 1 shows a schematic view of the case where a monomolecular film of a film compound having an epoxy group is formed on the entire surface of the first base material. Alternatively, the reaction mixture can be selectively applied onto only on the first joining surface using a screen printing method, an ink jet printing method, or the like. In this case, the monomolecular film is not formed in an area of a channel of a solution. Accordingly, the biochemical chip according to the present invention can also be suitably used even in the case where a compound that reacts with a functional group or a coupling reactive group contained in the monomolecular film is used.

(The above is related to step A)

In step B, a second film compound having an epoxy group is brought into contact with a second joining surface 12 of a second base material 22 made of glass to form a monomolecular film 14 of the second film compound having an epoxy group on the second joining surface 12 (see FIG. 2). The film compound that can be used, reaction conditions, and the like are the same as those in step A, and thus a detailed description thereof is omitted.

(The above is related to step B)

In step C, first, 2-methylimidazole is brought into contact with the monomolecular film 13 of the first film compound to form a bond by a coupling reaction between an epoxy group and an amino group of 2-methylimidazole, thereby forming a monomolecular film 15 of a 2-methylimidazole derivative on the surface of the monomolecular film 13 of the first film compound (see FIG. 3); and the first joining surface 11 further having the monomolecular film 15 of the 2-methylimidazole derivative thereon is then brought into contact by pressure with the second joining surface 12 having the monomolecular film 14 of the second film compound thereon to form a bond by a coupling reaction between an epoxy group and an imino group of 2-methylimidazole.

2-Methylimidazole has an amino group and an imino group, each of which reacts with an epoxy group, at the 1-position and the 3-position, respectively, and forms bonds by a coupling reaction shown in Chem. 6 below.

[Chem. 6]

The monomolecular film 15 of the 2-methylimidazole derivative is formed by applying a reaction mixture prepared by mixing 2-methylimidazole and a solvent onto the monomolecular film 13 of the first film compound formed on the first joining surface 11, and performing a reaction by heating. The application can be performed using any method such as a doctor blade method, a dip-coating method, a spin-coating method, a spray method, or a screen printing method.

In producing the reaction mixture, any solvent that can dissolve 2-methylimidazole can be used. In view of the price, the volatility at room temperature, the toxicity, and the like, a lower alcohol solvent such as isopropyl alcohol or ethanol is preferable.

The amount of 2-methylimidazole added, the concentration of the mixture applied, the reaction temperature, and the reaction time are appropriately adjusted in accordance with, for example, the types of base material and film compound used.

After the reaction, washing is performed with a solvent to remove excess 2-methylimidazole remaining on the surface as an unreacted product. Consequently, the monomolecular film 15 of the 2-methylimidazole derivative is further formed on the surface of the monomolecular film 13 of the first film compound (see FIG. 3).

The first joining surface 11 further having the monomolecular film 15 of the 2-methylimidazole derivative thus obtained thereon and the second joining surface 12 having the monomolecular film 14 of the second film compound thereon are brought into contact with each other by pressure and heated. Consequently, the first joining surface 11 is adhered to the second joining surface 12 via a bond formed by a coupling reaction between the epoxy group on the monomolecular film 14 of the second film compound formed on the second joining surface 12 and an imino group of the 2-methylimidazole derivative covering the first joining surface 11, and thus the biochemical chip 10 is obtained (see FIG. 1).

The heating temperature is preferably in the range of 50° C. to 150° C. If the heating temperature is lower than 50° C., it takes a long time to carry out the coupling reaction. If the heating temperature exceeds 150° C., a problem such as a decrease in the dimensional accuracy occurs.

Furthermore, when the adhesion is achieved while heating the first base material 21 and the second base material 22 at the same temperature, generation of thermal distortion after the adhesion can be suppressed to improve the dimensional accuracy.

In this embodiment, 2-methylimidazole is used as a coupling agent. Alternatively, any imidazole derivative represented by Chem. 7 below can be used.

[Chem. 7]

Specific examples of the imidazole derivative represented by Chem. 7 include compounds represented by (31) to (38) below.

(31) 2-methylimidazole ($R_2$=Me, $R_4$=$R_5$=H)
(32) 2-undecylimidazole ($R_2$=$C_{11}H_{23}$, $R_4$=$R_5$=H)
(33) 2-pentadecylimidazole ($R_2$=$C_{15}H_{31}$, $R_4$=$R_5$=H)
(34) 2-methyl-4-ethylimidazole ($R_2$=Me, $R_4$=Et, $R_5$=H)
(35) 2-phenylimidazole ($R_2$=Ph, $R_4$=$R_5$=H)
(36) 2-phenyl-4-ethylimidazole ($R_2$=Ph, $R_4$=Et, $R_5$=H)
(37) 2-phenyl-4-methyl-5-hydroxymethylimidazole ($R_2$=Ph, $R_4$=Me, $R_5$=$CH_2OH$)
(38) 2-phenyl-4,5-bis(hydroxymethyl)imidazole ($R_2$=Ph, $R_4$=$R_5$=$CH_2OH$)

Note that Me, Et, and Ph represent a methyl group, an ethyl group, and a phenyl group, respectively.

Alternatively, other than the imidazole derivative, a heterocyclic compound containing two or more nitrogen atoms, namely, melamine, isocyanuric acid, triazine, barbituric acid, parabanic acid, uracil, thymine, or the like can also be used. Furthermore, an imidazole-metal complex may also be used.

Alternatively, a compound such as an acid anhydride, e.g., phthalic anhydride or maleic anhydride; dicyandiamide; or a phenol derivative, e.g., novolac, each of which is used as a curing agent of an epoxy resin, can be used as the coupling agent. In such a case, an imidazole derivative may be used as a catalyst in order to accelerate the coupling reaction.

In this embodiment, a description is made of the case where a film compound having an epoxy group as a functional group is used. When a film compound having an amino group or an imino group as a functional group is used, a coupling agent having, as the coupling reactive groups, two or three or more epoxy groups, or two or three or more isocyanate groups is used.

When, for example, an epoxy group and an isocyanate group are used as the coupling agent, coupling reactions shown in Chem. 8 and Chem. 9 below occur, respectively.

[Chem. 8]

[Chem. 9]

Specific examples of the compound having isocyanate groups include p-phenylene diisocyanate, hexamethylene-1,6-diisocyanate, toluene-2,6-diisocyanate, and toluene-2,4-diisocyanate.

The amount of diisocyanate compound added is appropriately adjusted as in the case of 2-methylimidazole. In this case, examples of the solvent that can be used for producing the reaction mixture include aromatic organic solvents such as xylene.

In addition, when a film compound having an amino group is used, a compound having two or three or more epoxy groups such as ethylene glycol diglycidyl ether can also be used as the coupling agent.

In this embodiment, a coating film of 2-methylimidazole is formed in advance, and adhesion is then achieved. Alternatively, a solution of 2-methylimidazole may be applied on either one of or both of the monomolecular film of the first film compound and the monomolecular film of the second film compound, and both the monomolecular films may then be brought into contact with each other by pessure to achieve adhesion.

(The above is related to step C)

A biochemical chip and a method of producing the same have been described here. An optical component can also be produced by the same method, and thus a detailed description thereof is omitted.

EXAMPLES

Examples performed in order to verify the advantages of the present invention will be described below, but the present invention is not limited to these examples. In these examples, production of a biochemical chip and lens including a glass base material will be described as typical examples.

Example 1

Production of Biochemical Chip (1) Formation of Monomolecular Film of Film Compound Having Epoxy Group on Joining Surfaces of Biochemical Chip Substrates A pair of glass biochemical chip substrates (a channel having a channel width in the range of 10 to 100 µm and a depth of about 50 µm was formed on one of the substrates by photolithography and wet etching) were prepared, sufficiently washed and then dried.

Subsequently, 0.99 parts by weight of 3-glycidyloxypropyltrimethoxysilane (Chem. 10, manufactured by Shin-Etsu Chemical Co., Ltd.) and 0.01 parts by weight of dibutyltin bisacetylacetonate (condensation catalyst) were weighed and then dissolved in 100 parts by weight of hexamethyldisiloxane to prepare a reaction mixture.

[Chem. 10]

The reaction mixture thus prepared was applied onto a joining surface of each of the substrates and allowed to react in air (relative humidity: 45%) for about two hours. Subsequently, washing was performed with chloroform to remove excess alkoxysilane compound and dibutyltin bisacetylacetonate. A monomolecular film (having a thickness of about 1 nanometer) of the film compound having an epoxy group was formed over the entire joining surfaces.

(2) Formation of Monomolecular Film of 2-Methylimidazole Derivative

2-Methylimidazole dissolved in an alcohol was applied onto one of the epoxidized biochemical chip substrates on which the monomolecular film was formed in (1) and allowed to react under heating at 50° C. to 100° C. Washing was then performed with ethanol. Consequently, a monomolecular film of a 2-methylimidazole derivative was further formed on the surface of the monomolecular film of the film compound.

(3) Adhesion with Biochemical Chip Substrate

The biochemical chip substrate on which the monomolecular film of the film compound having an epoxy group was formed in (1) and the biochemical chip substrate on which the monomolecular film of the 2-methylimidazole derivative was formed in (2) were heated in advance at 150° C. Both substrates were disposed so that the joining surfaces faced each other, brought into contact with each other by pressure, and then heated at 150° C. Consequently, a biochemical chip was obtained.

Example 2

Production of Cemented Lens

Adhesion of a cemented lens was achieved by the same method as in Example 1 using two lenses for a cemented lens. Regarding the resulting cemented lens, discoloration, distortion of the field of view, aberration, interference fringe formation, or the like was not observed.

REFERENCE NUMERALS

10: biochemical chip, 11: first joining surface, 12: second joining surface, 13: monomolecular film of a first film compound, 14: monomolecular film of a second film compound, 15: monomolecular film of a 2-methylimidazole derivative, 21: first base material, 22: second base material, 23: hydroxyl group

The invention claimed is:

1. An optical component comprising:
a first member and a second member,
wherein:
on a first joining surface of the first member, a first coating film of a first film compound having a first functional group at an end of its molecule and covalently bonded to the first joining surface at another end thereof;
on a second joining surface of the second member, a second coating film of a second film compound having a second functional group at an end of its molecule and covalently bonded to the second joining surface at another end thereof;
the first functional group and the second functional group are covalently bonded to each other via bonds formed by coupling reactions: between the first functional group and a coupling agent having at least one first coupling reactive group configured to form a covalent bond by a coupling reaction with the first functional group and at least one second coupling reactive group that is configured to form a covalent bond by a coupling reaction with the second functional group; and between the second functional group and the coupling agent, the first joining surface is adhered to the second joining surface via the formed bonds;
the first functional group comprises an epoxy group;
the second functional group comprises an epoxy group; and
the coupling agent comprises an imidazole.

2. The optical component of claim 1, wherein each of the coating film of the first film compound and the coating film of the second film compound is a monomolecular film.

3. The optical component of claim 1 which is a light transmissive member.

4. The optical component of claim 1 which is a lens, a prism, an optical fiber, or an optical recording medium.

5. The optical component of claim 1, wherein the imidazole is represented as:

wherein:
$R_2$ is alkyl or aryl;
$R_4$ is H, alkyl, or hydroxyalkyl; and
$R_5$ is H, alkyl, or hydroxyalkyl.

6. The optical component of claim 5, wherein $R_2$ is methyl, undecanyl, pentadecanyl, or phenyl.

7. The optical component of claim 5, wherein $R_4$ is H, methyl, ethyl, or hydroxymethyl.

8. The optical component of claim 5, wherein $R_5$ is H, methyl, ethyl, or hydroxymethyl.

9. The optical component of claim 1, wherein the imidazole is 2-methylimidazole, 2-undecylimidazole, 2-pentadecylimidazole, 2-methyl-4-ethylimidazole, 2-phenylimidazole, 2-phenyl-4-ethylimidazole, 2-phenyl-4-methyl-5-hydroxymethylimidazole, or 2-phenyl-4,5-bis(hydroxymethyl) imidazole.

10. The optical component of claim 1, wherein the epoxy groups individually comprise a glycidyloxy group or a 3,4-epoxycyclohexyl group.

11. An adhered article comprising:
a first member and a second member;
wherein:
on a first joining surface of the first member, a first coating film of a first film compound having a first functional group at an end of its molecule and covalently bonded to the first joining surface at another end thereof;
on a second joining surface of the second member, a second coating film of a second film compound having a second functional group at an end of its molecule and covalently bonded to the second joining surface at another end thereof;
the first functional group and the second functional group are covalently bonded to each other via bonds formed by coupling reactions: between the first functional group and a coupling agent having at least one first coupling reactive group configured to form a covalent bond by a coupling reaction with the first functional group and at least one second coupling reactive group that is configured to form a covalent bond by a coupling reaction with the second functional group; and between the second functional group and the coupling agent, the first joining surface is adhered to the second joining surface via the formed bonds;
the first functional group comprises an epoxy group;
the second functional group comprises an epoxy group; and
the coupling agent comprises an imidazole.

12. The adhered article of claim 11 which is a biochemical chip or optical component.

13. The adhered article of claim 12, wherein the optical component a light transmissive member.

14. The adhered article of claim 12, wherein the optical component is a lens, a prism, an optical fiber, or an optical recording medium.

* * * * *

UNITED STATES PATENT AND TRADEMARK OFFICE
CERTIFICATE OF CORRECTION

PATENT NO. : 8,597,460 B2
APPLICATION NO. : 13/767094
DATED : December 3, 2013
INVENTOR(S) : Kazufumi Ogawa It is certified that error appears in the above-identified patent and that said Letters Patent is hereby corrected as shown below:

IN THE SPECIFICATION

In Column 1, Line 56, delete "2005-221478" and insert -- 2005-221478. --, therefor.

In Column 1, Line 58, delete "2003-246971" and insert -- 2003-246971. --, therefor.

In Column 8, Line 18, delete "2-ethylhexenoate" and insert -- 2-ethylhexanoate --, therefor.

In Column 15, Line 2, delete "group" and insert -- group. --, therefor.

Signed and Sealed this
Twenty-eighth Day of January, 2014

Michelle K. Lee
*Deputy Director of the United States Patent and Trademark Office*